United States Patent
Lodi

(10) Patent No.: US 9,193,392 B2
(45) Date of Patent: Nov. 24, 2015

(54) SUPPORT FOR A WING

(71) Applicant: LODI LUIGI & FIGLI S.R.L., Fabbrico (Reggio Emilia) (IT)

(72) Inventor: Luigi Lodi, Fabbrico (IT)

(73) Assignee: LODI LUIGI & FIGLI S.R.L., Fabbrico (IT)

( * ) Notice: Subject to any disclaimer, the term of this patent is extended or adjusted under 35 U.S.C. 154(b) by 248 days.

(21) Appl. No.: 13/900,188

(22) Filed: May 22, 2013

(65) Prior Publication Data

US 2013/0313389 A1    Nov. 28, 2013

(30) Foreign Application Priority Data

May 25, 2012   (IT) .............................. MO2012A0136

(51) Int. Cl.
*B62D 25/18*   (2006.01)
*B62D 25/16*   (2006.01)
*B62D 25/00*   (2006.01)
*B62D 25/04*   (2006.01)
*B62D 29/04*   (2006.01)

(52) U.S. Cl.
CPC .............. *B62D 25/166* (2013.01); *B62D 25/00* (2013.01); *B62D 25/04* (2013.01); *B62D 25/16* (2013.01); *B62D 25/163* (2013.01); *B62D 25/168* (2013.01); *B62D 25/186* (2013.01); *B62D 29/04* (2013.01)

(58) Field of Classification Search
CPC .... B62D 25/166; B62D 25/04; B62D 25/163; B62D 25/186; B62D 25/00; B62D 25/168; B62D 25/16; B62D 29/04
USPC .................. 248/214; 280/156, 157, 847, 848; 296/198
See application file for complete search history.

(56) References Cited

U.S. PATENT DOCUMENTS

| 5,169,167 A * | 12/1992 | Willson et al. ................ 280/157 |
| 5,794,956 A | 8/1998 | Hurlburt et al. |
| 5,975,548 A * | 11/1999 | Galli et al. .................... 280/157 |
| 8,388,003 B2 * | 3/2013 | Wellman et al. .............. 280/157 |
| 8,882,121 B2 * | 11/2014 | Ducroquet .................... 280/157 |
| 2006/0108765 A1 | 5/2006 | Teich |
| 2007/0273122 A1 | 11/2007 | Lodi et al. |
| 2012/0080908 A1 * | 4/2012 | Wellman et al. .............. 296/198 |

FOREIGN PATENT DOCUMENTS

FR           2 595 313  A1    9/1987

* cited by examiner

*Primary Examiner* — Anita M King
(74) *Attorney, Agent, or Firm* — Pearne & Gordon LLP

(57) ABSTRACT

A support for a wing, comprising: a first attachment body (2), predisposed to be constrained to a support (91) of a wheel (90) in such a manner as to be solidly constrained to the wheel with respect to the rotation about a steering axis (ST); a second attachment body (31, 32), predisposed to be connected to a wing (100), and rotatably connected to the first attachment body (2) about a main rotation axis (X), parallel to the steering axis (ST), by means of a rotation pin (4); said first attachment body (2) being rotatable with respect to the second attachment body (31, 32) between an initial position and a final position that are spaced one from the other by a given angular pitch with respect to the main rotation axis (X); a guide element (6) that is solidly constrained to the first attachment body (2) and to the second attachment body (31, 32) with respect to the translation parallel to the main rotation axis (X), and it is slidable with respect to the first attachment body and/or to the second attachment body along a circular arc trajectory (T) concentric to the main rotation axis (X).

14 Claims, 5 Drawing Sheets

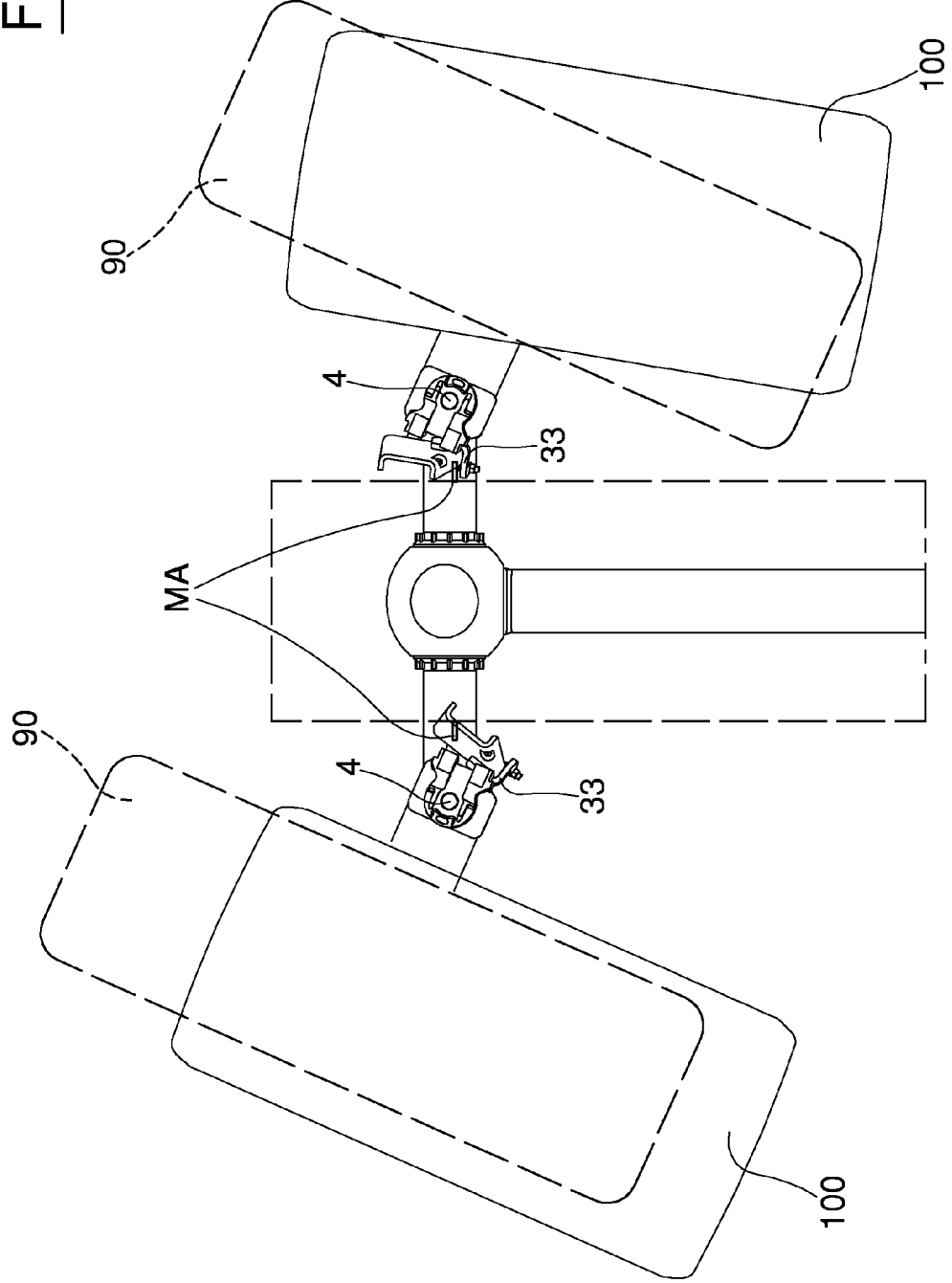

SUPPORT FOR A WING

The object of the present invention is a support for a wing.

The invention refers in particular to a support for a wing of a farm vehicle, such as a tractor for example.

Wheeled farm tractors are equipped with front steering wheels, which, in many cases, are provided with wings. The wing is connected to the wheel thereof by means of a support, located on the inner side of the wheel, provided with an L-shaped arm that supports the wing above the wheel.

When steering of the front wheels of the tractor is performed, each wheel inclines with respect to the direction of advancement of the tractor about the steering axis thereof, which is arranged perpendicularly to the direction of advancement and to the rotation axis of the wheels.

Given that the wing projects posteriorly from the wheel, it happens that the wing of the front wheel that is internal with respect to the curved trajectory imposed by the steering, comes into contact with the flank of the nose of the tractor, thereby not allowing the internal wheel, and thus also the external wheel, to reach the maximum steering angle.

To overcome this drawback, the filer has devised a support for a wing that comprises a first and a second attachment element that are rotatably connected to each other about an axis parallel to the steering axis of the wheel. A first attachment element is connected to the support of the wheel, in such a manner as to be solidly constrained to the wheel with respect to the rotation about the steering axis. The second attachment element, predisposed to support the wing above the wheel, is provided with the possibility to rotate with respect to the first attachment element about a rotation pin between a first position, in which it is aligned with the first attachment element, and a second position, in which it is not aligned with the first attachment element. A spiral spring is interposed between the first and the second attachment element so as to rotate the second attachment element elastically towards the first position.

The support devised by the filer allows for the wing and the wheel to be solidly constrained with respect to the rotation about the steering axis up to a given position in which the wing could interfere with the flank of the tractor. In this position, a stop body locks the rotation of the second attachment element, while, owing to the rotating coupling with the second attachment element, the first attachment element and the wheel connected thereto are free to continue rotation about the steering axis until reaching the maximum steering angle provided. When the wheel and the first attachment element return to the stop position of the second attachment element, the spiral spring returns the second attachment element to the first position in which it is aligned with the first attachment element and the wing is aligned with the wheel.

Although this is a very efficient and functional support for a wing, the filer has found that the support could be improved in terms of resistance and duration.

In fact, the rotation pin is subject to considerable bending stresses, due to the oscillations of the wing that are transmitted to the second attachment element. After a certain number of operating cycles, this results in the breakage of the rotation pin.

The aim of the present invention is to offer a support for a wing that makes it possible to overcome the drawbacks of the supports currently available on the market.

An advantage of the support according to the present invention is that it is much more resistant than the currently available supports, while maintaining the same operating efficiency.

Another advantage of the support according to the present invention is that it can be used in place of currently available supports without requiring particular work on the vehicles for the purpose of adaptation.

Further characteristics and advantages of the support for a wing according to the present invention will prove to be clearer from the following description, provided by way of non-limiting example, with reference to the accompanying figures, in which:

FIG. 8 shows both front non-driving wheels steered rightwards in a position in which the support for the right wheel has come into operation and the right wheel is not aligned with the wing.

The figures show in greater detail a support for a wing according to the present invention paired with a front left wheel. FIGS. 1 to 7 show a support paired with the front left non-driving wheel of a farm tractor. The support for the right wheel is substantially a mirror image of that shown in the figures with respect to a vertical plane perpendicular to the rotation axes of the wheels. The support is shown paired with a non-driving wheel for the sake of further simplification, but the support is perfectly suited to be paired with a driving wheel as well.

The support for a wing according to the present invention comprises a first attachment body (2), predisposed to be constrained to a support (91) of a wheel (90) in such a manner as to be solidly constrained to the wheel with respect to the rotation about a steering axis (ST). The support (91) is connected to the chassis of the tractor by means of a suspension and rotatably supports the rotation axle of the wheel (90). Therefore the support (91) is not rotatable together with the wheel about the rotation axis (R) of the wheel. The wheel (90) is also provided with a steering axis (ST) that is perpendicular to the rotation axis (R). When the wheel (90) is resting on a horizontal surface, the steering axis (ST) is substantially vertical.

The first attachment body (2) is preferably in the form of a shaped plate equipped with fastening means (21), for example screws, for the fastening thereof to the support (91) of the wheel.

Figure 1:
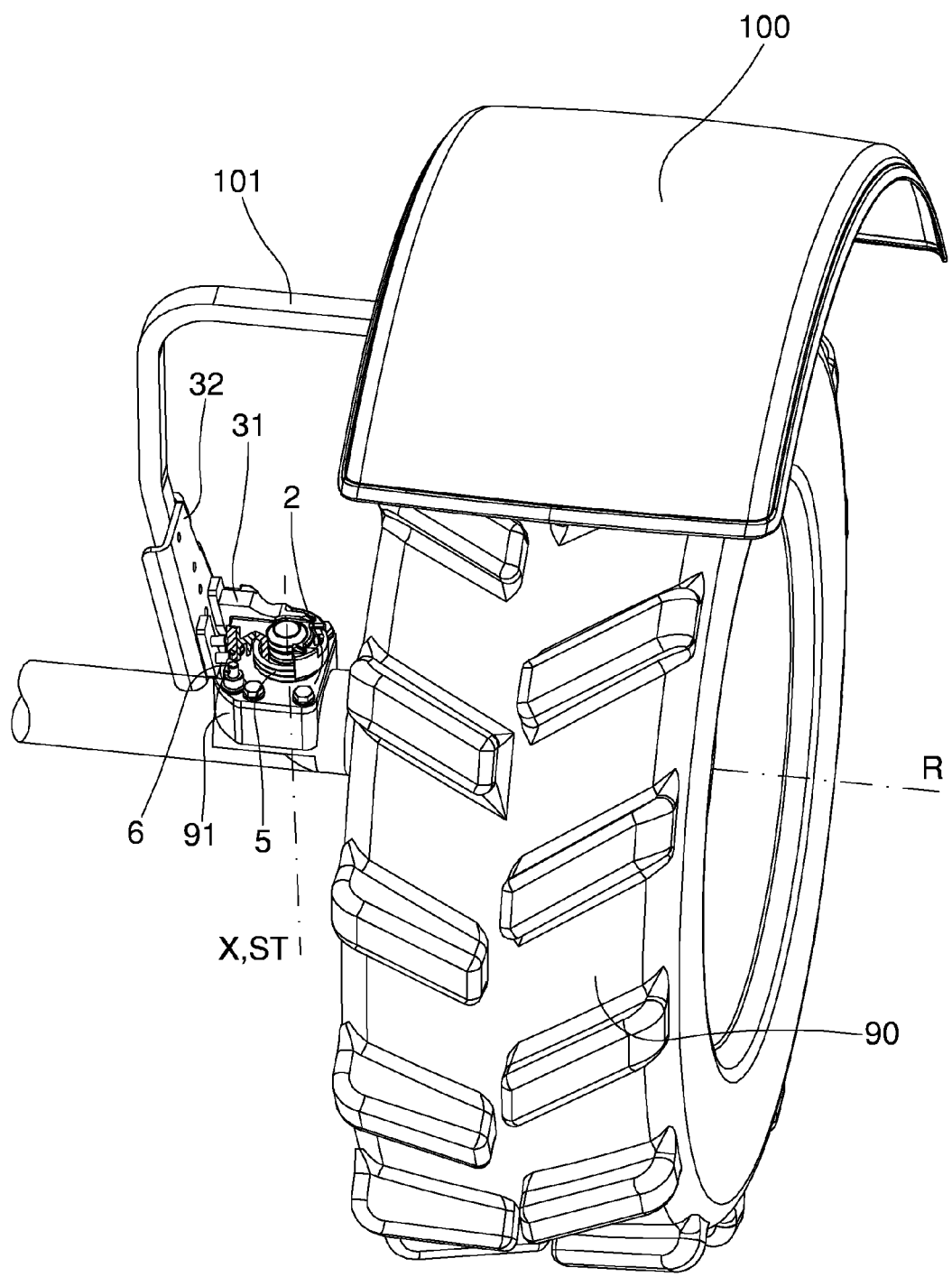
FIG. 1 shows a front left non-driving wheel, seen from the front, and with which a support for a wing according to the present invention is paired.

The support further comprises a second attachment body (31, 32), predisposed to be connected to a wing (100). As shown in FIG. 1, the wing (100) is connected to the second attachment body (31, 32) by means of an L-shaped arm (101) that supports the wing (100) projecting above the wheel (90).

The second attachment body (31, 32) is rotatably connected to the first attachment body (2) about a main rotation axis (X), parallel to the steering axis (ST), by means of a rotation pin (4). In the preferred embodiment of the support, the first and the second attachment bodies are conformed so as to be connected to the support (91) for the wheel (90) with the main rotation axis (X) coinciding with the steering axis (ST). The first attachment body (2) is rotatable with respect to the second attachment body (31, 32) between an initial position and a final position that are spaced one from the other by a given angular pitch with respect to the main rotation axis (X). In the initial position of the first attachment body (2), as shown in FIGS. 1, 2, 3 and 6, the wing (100) and the wheel (90) are aligned with each other, whereas in the final position, illustrated in FIGS. 4, 5 and 7, they are not aligned with each other.

An elastic means (5) is interposed between the first and the second attachment body. The elastic means (5) is structured so as to block rotation of the first attachment body (2) from the initial position towards the final position.

Figure 6:
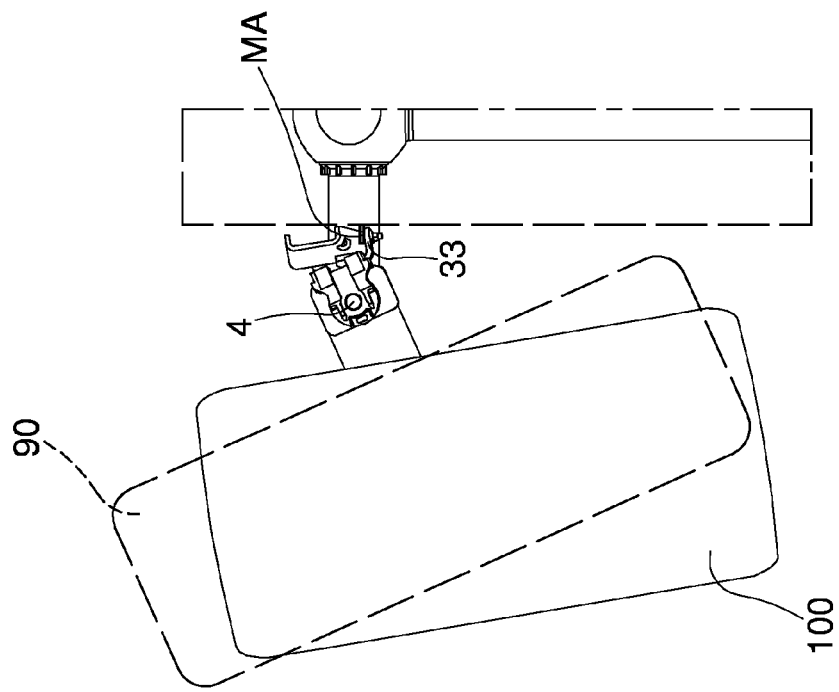
FIG. 6 shows the front left non-driving wheel in a position for steering leftwards, in which the supporting device has not come into operation and the wheel is aligned with the wing.

With reference to the left support shown in the figures, the initial position of the second attachment body (2) is maintained until the wheel completes a counter clockwise rotation of a pre-established amplitude about the steering axis thereof (FIG. 6).

Figure 7:
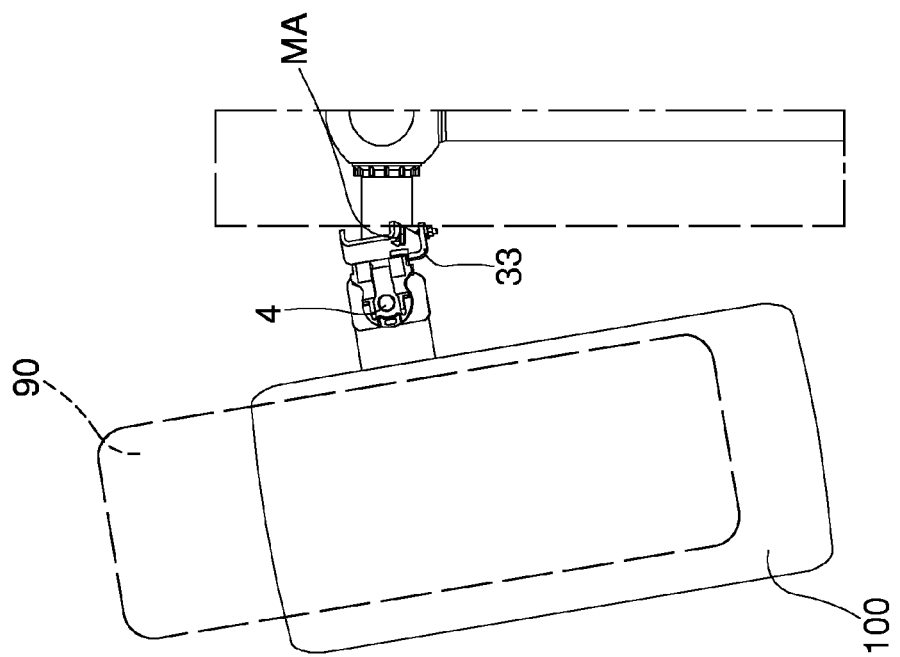
FIG. 7 shows the front left non-driving wheel in a steering position in which the supporting device has come into operation and the wheel is no longer aligned with the wing.

With further reference to the left support shown in the figures, steering the wheel leftwards, that is, in a counter clockwise direction with the wheel seen from above, the first and the second attachment bodies rotate solidly about the steering axis (ST) and the wing (100) approaches, in the rear zone, the flank of the tractor. A stop means (MA), which is only schematically illustrated in FIGS. 5 to 8 as it is well known, comes into contact with the second attachment body (31, 32), locking the rotation thereof before the wing (100) comes into contact with the flank of the tractor (FIG. 7). Until the moment of interaction between the second attachment body (31, 32) and the stop means, the first attachment body (2) and the second attachment body (31, 32) rotate solidly about the steering axis (ST), and the first attachment body (2) remains in its initial position with respect to the second attachment body (31, 32), while the wheel (90) remains aligned with the wing (100). When the second attachment body (31, 32) comes into contact with the stop means, the first attachment body (2), and the wheel solidly constrained thereto, continue in the rotation leftwards by a given angle until reaching the final position of the first attachment body (2). In the preferred embodiment of the support, in which it is provided that the main rotation axis (X) coincides with the steering axis (ST), there is no dragging at the point of contact between the stop means (MA) and the second attachment body. If, however, the main rotation axis (X) does not coincide with the steering axis (ST), there is dragging at the point of contact between the stop means (MA) and the second attachment body (31, 32).

The final position of the second attachment body (2) is substantially defined by the maximum steering angle of the wheel, without any necessity of taking into account the interference between the wing (100) and the flank of the tractor. Therefore, between the initial position and the final position of the first attachment body (2), the wing and the wheel take on different angular positions with respect to the main rotation axis (X). The elastic means (5) compresses, blocking rotation of the first attachment body (2) with respect to the second attachment body (31, 32). During the blocked rotation of the left wheel about the steering axis thereof, the first attachment body (2) rotates from the final position towards the initial position. When the first attachment body (2) reaches the initial position, the elastic means (5) keeps it in the initial position so that the wing (100) and the wheel (90) re-align one with the other.

The operation of the support for the right wheel is identical to that described above, but mirrored with respect to a vertical plane perpendicular to the rotation axis of the wheels.

The support according to the present invention comprises a guide element (6) that is solidly constrained to the first attachment body (2) and to the second attachment body (31, 32) with respect to the translation parallel to the main rotation axis (X), and it is slidable with respect to the first attachment body and/or to the second attachment body along a circular arc trajectory (T) concentric to the main rotation axis (X). The second guide element (6) is essentially off-center with respect to the rotation pin (4).

The presence of the guide element (6), which is solidly constrained to the first attachment body (2) and to the second attachment body (31, 32) with respect to the translation parallel to the main rotation axis (X), makes it possible to relieve the rotation pin (4) of bending stresses. In fact, each stress that tends to make the first support body (2) rotate with respect to the second support body (31, 32) about a horizontal axis that intersects the main rotation axis (X), a stress that would cause bending of the rotation pin (4), is countered with a moment substantially given as the distance that separates the main rotation axis (X) and the trajectory (T) multiplied by a force directed parallel to the main axis (X) along the guide element (6). In other words, a stress that tends to make the first support body (2) rotate with respect to the second support body (31, 32) about a horizontal axis that intersects the main rotation axis (X), virtually only becomes tensile or compressive stress on the guide element (6). In this manner, the bending stresses on the rotation pin (4) are eliminated or at the least reduced to very slight levels, so that the duration of the rotation pin (4) increases considerably compared to the supports that are currently available. To increase the advantageous effect of the guide element (6) further, it is arranged in a position aligned with the main rotation axis (X) and the centre of gravity of the body constituted by the arm (101) and by the wing (100).

In a preferred embodiment of the support, the trajectory (T) of the guide element (6) is defined by an arcuate groove (7) concentric to the main rotation axis (X). Preferably, the arcuate groove (7) is made on the first attachment body (2), but it could also be afforded on the second attachment body (31, 32). In particular, the arcuate groove (7) is a through groove that passes through the first attachment body (2).

In the preferred embodiment of the support, the guide element (6) is solidly constrained to the second attachment body (31, 32) with respect to the translation perpendicular to the main rotation axis (X). Preferably, the guide element (6) is rigidly constrained to the second attachment body (31, 32), if necessary with the possibility of the guide element (6) rotating about a longitudinal axis thereof parallel to the main rotation axis (X). In an alternative embodiment, if the arcuate groove (7) is afforded on the second attachment body (31, 32), the guide element (6) may be solidly constrained to the first attachment body (2).

Figure 3:
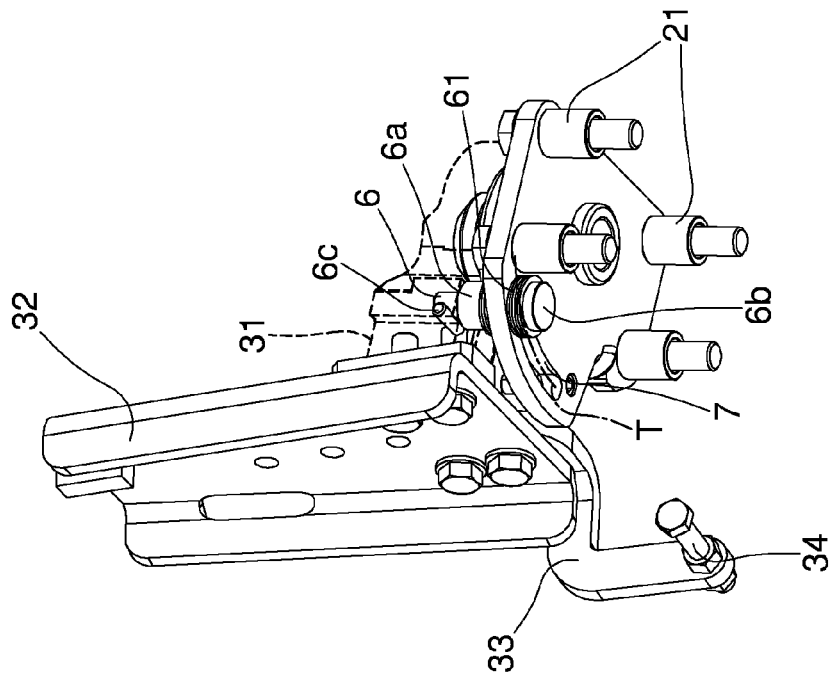
FIGS. 2 and 3 are two axonometric views of the support according to the present invention, in an initial position.
Figure 2:
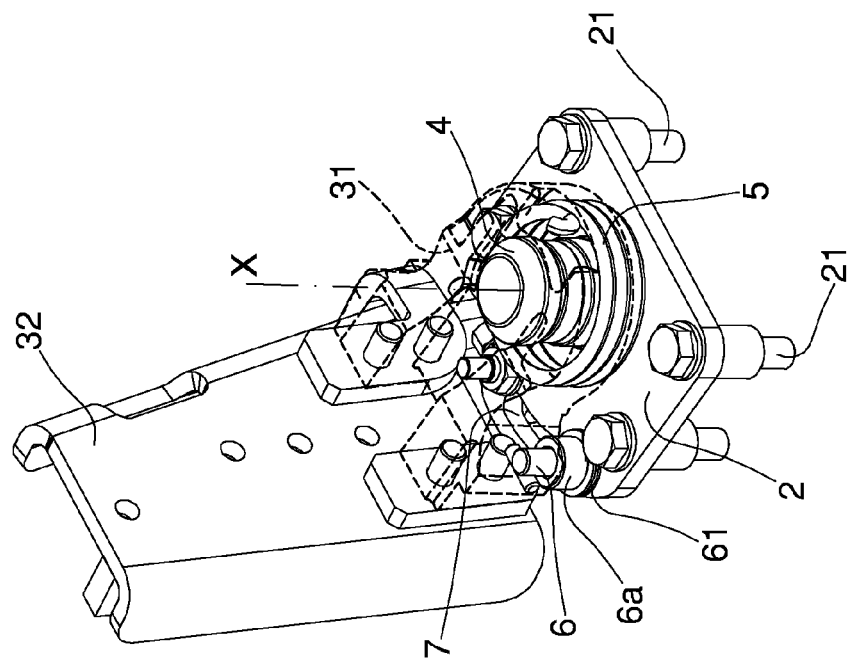

The guide element (6) is preferably in the form of a pin arranged through the arcuate groove (7) and it is solidly constrained to the groove itself with respect to the translation parallel to the main rotation axis (X) by means of striker plates (6a, 6b) arranged on opposite parts of the first attachment body (2). As shown in FIGS. 2 and 3, the first striker plate (6a) may be defined by a head portion of the guide element (6), whereas the second striker plate (6b) may be defined by an annular element arranged concentrically to the guide element (6). The guide element (6) is fastened to the second attachment body (31, 32) for example by means of a dowel (6c) arranged transverse to the guide element (6).

The guide element (6) is provided with shock-absorbing means (61) predisposed to absorb at least partially the stresses directed parallel to the main rotation axis (X). In the preferred embodiment of the support, the shock-absorbing means (61) is interposed between the striker plates (6a, 6b) of the guide element and the first attachment body (2). As can be seen in FIGS. 2 and 3, each striker element (6a, 6b) is in contact with a surface of the first attachment body (2) by means of the shock-absorbing means (61). The shock-absorbing means (61) may be constituted for example by disc springs concentric to the guide element. The presence of the shock-absorbing means (61) makes a further increase in the duration of the support possible.

Figure 5:
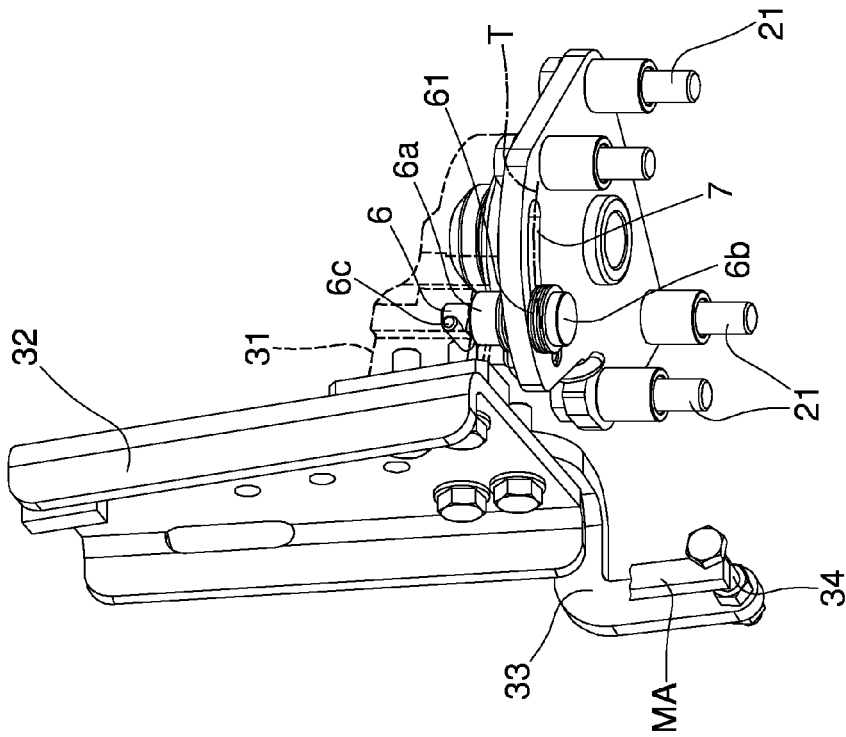
FIGS. 4 and 5 show the support illustrated in FIGS. 2 and 3, but in a final position.
Figure 4:
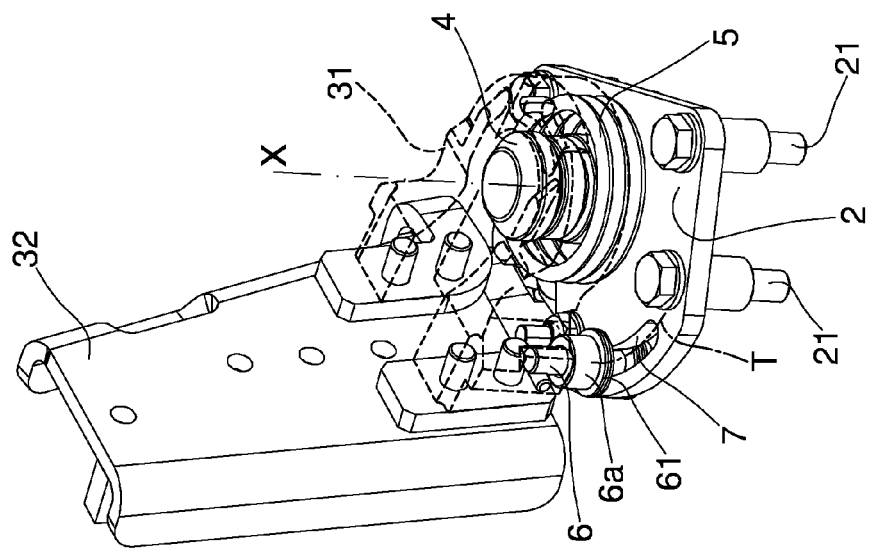

The arcuate groove (7) can also function as a stop for the guide element (6), as shown in FIGS. 4 and 5. The action exerted by the elastic means (5) keeps the guide element (6) in contact with one end of the arcuate groove (7), which functions as a stop. The position of the stop for the guide element (6) corresponds to the initial position of the first attachment element (2).

In the preferred embodiment of the support, the second attachment body (31, 32) comprises a shell (31), equipped with a seat for the rotation pin (4) and a housing for the elastic means (5). The housing for the elastic means (5) is open towards the first attachment body (2) that is arranged below the shell (31). The elastic means (5) is preferably in the form of a spiral spring, a first end of which is constrained to a seat afforded on the shell (31), whereas the second end is constrained to a seat afforded on the first attachment body (2).

The second attachment body (31, 32) further comprises a shaped plate (32), connected to the shell (31) and predisposed so as to permit the attachment of a supporting arm (101) for the wing (100). A striker arm (33) is also solidly constrained to the second attachment body (31, 32). The striker arm (33) is equipped with a striker element (34) predisposed to come into contact with the stop means (MA) predisposed to stop the rotation of the second attachment body (31, 32). Advantageously, the striker arm (33) is structured in such a manner that the striker element (34) is found in a position that makes it possible to stop the rotation of the second attachment body (31, 32) before the wing comes in contact with the flank of the tractor. As mentioned previously, in the preferred embodiment of the support, in which it is provided that the main rotation axis (X) coincides with the steering axis (ST), there is substantially no dragging at the point of contact between the stop means (MA) and the striker element (34). If, however, the main rotation axis (X) does not coincide with the steering axis (ST), there is dragging at the point of contact between the stop means (MA) and the striker element (34).

The invention claimed is:

1. A support for a wing, comprising: a first attachment body (2), predisposed to be constrained to a support (91) of a wheel (90) in such a manner as to be solidly constrained to the wheel with respect to the rotation about a steering axis (ST); a second attachment body (31, 32), predisposed to be connected to a wing (100), and rotatably connected to the first attachment body (2) about a main rotation axis (X), parallel to the steering axis (ST), by a rotation pin (4); said first attachment body (2) being rotatable with respect to the second attachment body (31, 32) between an initial position and a final position that are spaced one from the other by a given angular pitch with respect to the main rotation axis (X); characterized in that it comprises a guide element (6) that is solidly constrained to the first attachment body (2) and to the second attachment body (31, 32) with respect to the translation parallel to the main rotation axis (X), and it is slidable with respect to the first attachment body and/or to the second attachment body along a circular arc trajectory (T) concentric to the main rotation axis (X).

2. The support according to claim 1, wherein the trajectory (T) of the guide element (6) is defined by an arcuate groove (7) concentric to the main rotation axis (X).

3. The support according to claim 1, wherein the guide element (6) is solidly constrained to the second attachment body (31, 32) with respect to the translation perpendicular to the main rotation axis (X).

4. The support according to claim 2, wherein the arcuate groove (7) is made on the first attachment body (2).

5. The support according to claim 4, wherein the guide element (6) is in the form of a pin arranged inside the arcuate groove (7) and is solidly constrained to the groove itself with respect to the translation parallel to the main rotation axis (X) by striker plates (6a, 6b) arranged on opposite parts of the first attachment body (2).

6. The support according to claim 1, wherein the guide element (6) is provided with shock-absorbing means (61) predisposed to absorb at least partially the stresses directed parallel to the main rotation axis (X).

7. The support according to claim 5, wherein the guide element (6) is provided with shock-absorbing means (61) predisposed to absorb at least partially the stresses directed parallel to the main rotation axis (X), and wherein the shock-absorbing means (61) is interposed between the striker plates (6a, 6b) of the guide element (6) and the first attachment body (2).

8. The support according to claim 1, wherein the first attachment body (2) is in the form of a shaped plate equipped with fastening means (21) for the fastening thereof to the support (91) of a wheel.

9. The support according to claim 1, wherein the second attachment body (31, 32) comprises: a shell (31), equipped with a seat for the rotation pin (4) and a housing for an elastic means (5); a shaped plate (32), connected to the shell (31) and predisposed so as to permit the attachment of a supporting arm (101) for a wing (100).

10. The support according to claim 1, wherein the second attachment body (31, 32) comprises a striker arm (33) equipped with a striker element (34) predisposed to come into contact with stop means predisposed to stop the rotation of the second attachment body (31, 32) about the main rotation axis (X) in a given position.

11. The support according to claim 1, comprising elastic means (5), interposed between the first and the second attachment body, and predisposed to block rotation of the first attachment body (2) from the initial position towards the final position.

12. The support according to claim 1, comprising an arm (101), solidly constrained to the second attachment body (31, 32), and a wing (100), associated with the arm (101) above the first and the second attachment body, the center of mass of the wing (100) and of the arm (101) being aligned with the main rotation axis (X) and with the guide element (6).

13. The support according to claim 1, wherein the first attachment body (2) and the second attachment body (31, 32) are conformed so as to be connected to a support (91) for a wheel (90) in such a manner that the main rotation axis (X) coincides with the steering axis (ST).

14. The support according to claim 2, wherein the guide element (6) is solidly constrained to the second attachment body (31, 32) with respect to the translation perpendicular to the main rotation axis (X), and wherein the arcuate groove (7) is made on the first attachment body (2).

* * * * *

UNITED STATES PATENT AND TRADEMARK OFFICE
CERTIFICATE OF CORRECTION

PATENT NO. : 9,193,392 B2  
APPLICATION NO. : 13/900188  
DATED : November 24, 2015  
INVENTOR(S) : Luigi Lodi Page 1 of 1

It is certified that error appears in the above-identified patent and that said Letters Patent is hereby corrected as shown below:

IN THE SPECIFICATION

At column 4, line 5, please delete "second".

Signed and Sealed this  
Twenty-ninth Day of March, 2016

Michelle K. Lee  
*Director of the United States Patent and Trademark Office*